(12) United States Patent
Wiederrecht

(10) Patent No.: US 7,258,037 B2
(45) Date of Patent: Aug. 21, 2007

(54) GEAR PROTECTED AGAINST OVERLOADING

(75) Inventor: Jean-Marc Wiederrecht, Bernex/Genève (CH)

(73) Assignee: Technical Watch Research Limited, London (GB)

( * ) Notice: Subject to any disclaimer, the term of this patent is extended or adjusted under 35 U.S.C. 154(b) by 0 days.

(21) Appl. No.: 10/521,037

(22) PCT Filed: May 27, 2003

(86) PCT No.: PCT/CH03/00333

§ 371 (c)(1),
(2), (4) Date: Jan. 10, 2005

(87) PCT Pub. No.: WO2004/008004

PCT Pub. Date: Jan. 22, 2004

(65) Prior Publication Data

US 2006/0048596 A1    Mar. 9, 2006

(30) Foreign Application Priority Data

Jul. 10, 2002   (EP) .................................. 02405583

(51) Int. Cl.
*F16H 55/14* (2006.01)
(52) U.S. Cl. ............................ 74/461; 74/457; 74/460; 74/437; 74/440; 74/443; 74/DIG. 10
(58) Field of Classification Search .................. 74/461, 74/457, 460, 437, 440, 443, 450, 468, 409, 74/DIG. 10
See application file for complete search history.

(56) References Cited

U.S. PATENT DOCUMENTS

| 2,335,504 | A | * | 11/1943 | Gazda | .......................... 74/462 |
| 3,636,792 | A | * | 1/1972 | Vigh | ............................ 74/461 |
| 4,127,041 | A | * | 11/1978 | Imazaike | ...................... 74/411 |
| 4,473,301 | A | * | 9/1984 | Namyslo | ...................... 368/35 |
| 6,202,509 | B1 | * | 3/2001 | Dold | ............................ 74/640 |

FOREIGN PATENT DOCUMENTS

| JP | 54-158174 U |   | 12/1979 |
| JP | 58127246 | * | 8/1983 |
| JP | 59 019768 |   | 2/1984 |
| JP | 59-19768 | * | 2/1984 |
| JP | 4-194444 | * | 7/1992 |
| JP | 585037 | * | 3/2003 |

* cited by examiner

Primary Examiner—Richard Ridley
Assistant Examiner—Terence Boes
(74) Attorney, Agent, or Firm—Townsend M. Belser, Jr.; Nexsen Pruet Adams Kleemeier, LLC

(57) ABSTRACT

The invention concerns a gear for precision devices comprising at least two mutually co-operating toothed wheels (10, 14). The teeth (12, 16) of the two wheels have the same thickness (e) and the teeth of one of them (10) are provided with a radial slot (26) which divides them into half-teeth (22, 24). On of said half-tooth (24) comprises a recess (28) enabling its elastic deformation in case of overloading.

2 Claims, 1 Drawing Sheet

GEAR PROTECTED AGAINST OVERLOADING

BACKGROUND OF THE INVENTION

1. Field of the Invention

The present invention relates to the field of gears. It concerns, more particularly, an improvement made to the teeth of gear wheels, particularly for the purpose of using them in precision mechanisms, such as those used in horology.

2. Description of Related Art

Clock and watch designers employ gears having a clearance or play, i.e. a difference in thickness, between the teeth of the wheels of the two gear wheels that cooperate with each other. This enables any dimensional defects in the wheels to be corrected.

Unfortunately, the presence of clearances in the gears also constitutes a drawback, because of the addition of plays, when, particularly in a watch, the second or the minute is displayed off-center. The hand is then very likely to "float" on the fixed marks on the dial. Such a defect is particularly disadvantageous for "top of the range" products.

Various solutions have been proposed to compensate for the gear defects.

For example, FR Patent No. 2 379 736 proposes that the teeth of one of the wheels are provided with a radial slot made at the tip thereof and that said slot opens into a recess, which enables them to be deformed elastically at the moment that they come into contact with the opposite teeth of the other wheel. Such a solution suffers, however, from the fact that the teeth are liable to become too fragile and/or to have insufficient rigidity to transmit, with a satisfactory yield, significant energy provided by a high couple. Moreover, this document is completely silent as to the gear clearance.

SUMMARY OF INVENTION

It is an object of the present invention to provide a gear for precision devices, free from any drawbacks due to its clearance, while still being capable of elastic deformation upon compression, but maintaining sufficient rigidity to return the transmitted force with optimum yield.

More specifically, the invention concerns a gear for precision devices including at least two toothed wheels cooperating with each other, characterized in that:
- the teeth of the two wheels have the same thickness,
- the teeth of one of them is provided with a radial slot which divides them into two halves, and
- one of such halves is hollowed so as to be able to be deformed elastically upon compression.

BRIEF DESCRIPTION OF THE DRAWINGS

Other features of the invention will appear from the following description, made with reference to the annexed drawing, in which.

DETAILED DESCRIPTION OF THE INVENTION

Figure 1:
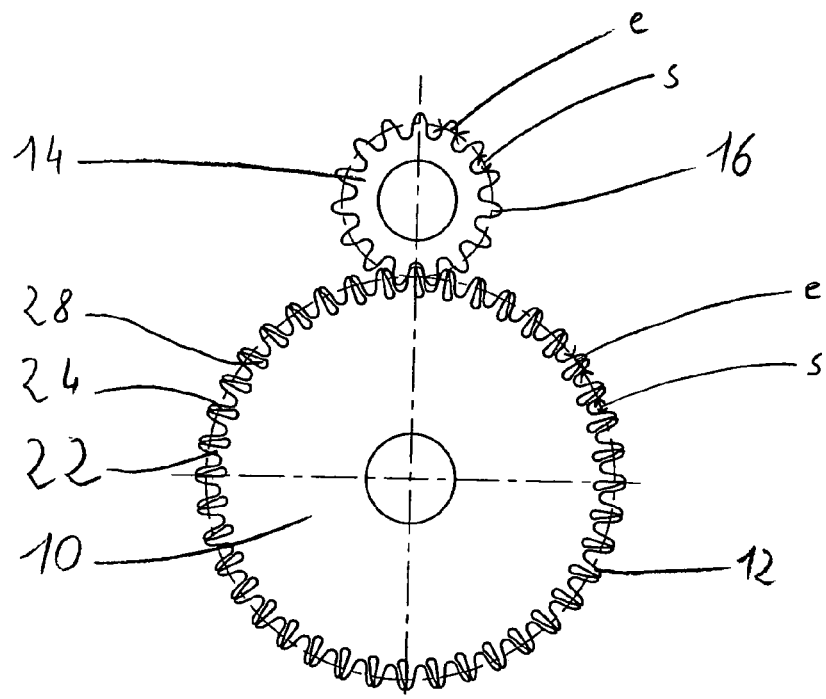
FIG. 1 shows an example embodiment of a gear according to the invention.

The drawing shows a gear formed of a wheel 10 with forty-five teeth 12 and a pinion 14 with fifteen teeth 16 cooperating with each other. The pitch circle of these wheels is shown at 18 and their root circle at 20. These wheels can just as well be made of plastic material as metal (brass, . . . ).

According to the invention, the gear has no clearance—or no play—i.e., there is no freedom between the teeth 12 of the wheel and the teeth 16 of the pinion (for those skilled in the art, values taken on pitch circle 18).

Figure 2:
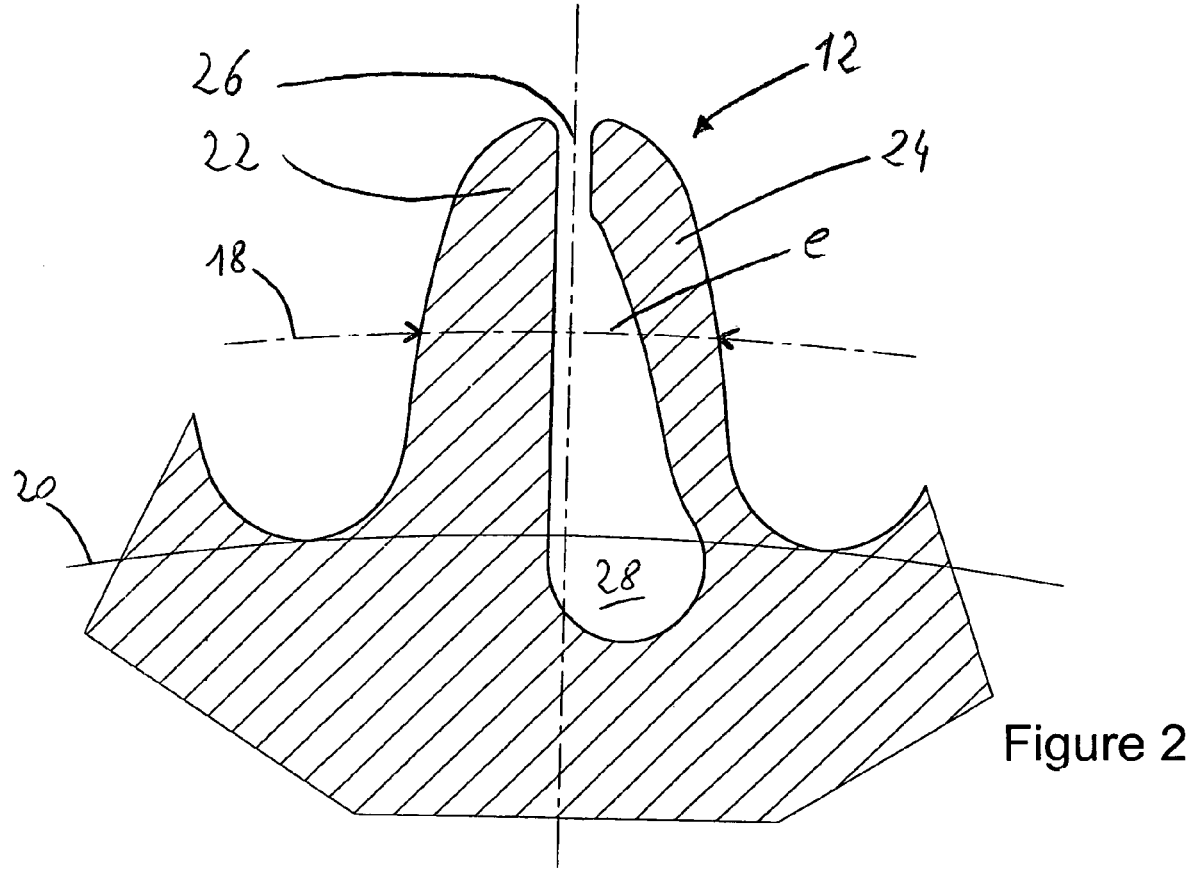
FIG. 2 is an enlarged view of one tooth of the gear of FIG. 1.

As is shown better in FIG. 2, teeth 12 of wheel 10 are separated into two halves 22 and 24 by a radial slot 26, i.e. formed along a radius of the wheel.

In the example shown, slot 26 extends slightly beyond root circle 20 and, at the tip of the teeth, has a width substantially corresponding to the clearance that the gear would have if it were of the conventional type.

The half-tooth 22 is complete, whereas half-tooth 24 is weakened by a recess 28 that enlarges increasingly from its tip towards root circle 20. Typically, the thickness of half-tooth 24, at pitch circle 18, is around half that of half-tooth 22.

Of course, the present description has only been given by way of example. It goes without saying that the length and the width of radial slot 26 as well as the shape and the dimension of recess 28 can be adapted, as a function of the intended application, to allow the most appropriate elastic deformation of half-tooth 24.

Thus, a gear without any clearance is made wherein, on the one hand, the complete half-tooth 22 has sufficient rigidity to properly ensure transmission of significant forces and, on the other hand, the thinned half-tooth 24 has an elasticity enabling it, first to yield upon compression, then to transmit the force after pressing against the other half-tooth.

What is claimed is:

1. A gear wheel having a plurality of gear teeth along a root circle for cooperating with the teeth of another toothed element without any clearance for use in precision devices, each of said gear teeth comprising:
   a radial slot opening tooth towards a tip of each of said gear teeth and dividing each of said gear teeth into a first half-tooth and a second half-tooth; and,
   a recess in said second half-tooth enabling said second half-tooth to be deformed elastically upon compression, said recess being enlarged increasingly away from the tip of the tooth towards the root circle of the wheel such that said second half-tooth has a width that increases from base to tip and said first half-tooth has a width that decreases from base to tip in order to have a rigidity greater than that of said first half-tooth.

2. A gear according to claim 1, wherein said radial slot extends beyond the root circle of the gear wheel.

* * * * *